United States Patent Office 3,413,195
Patented Nov. 26, 1968

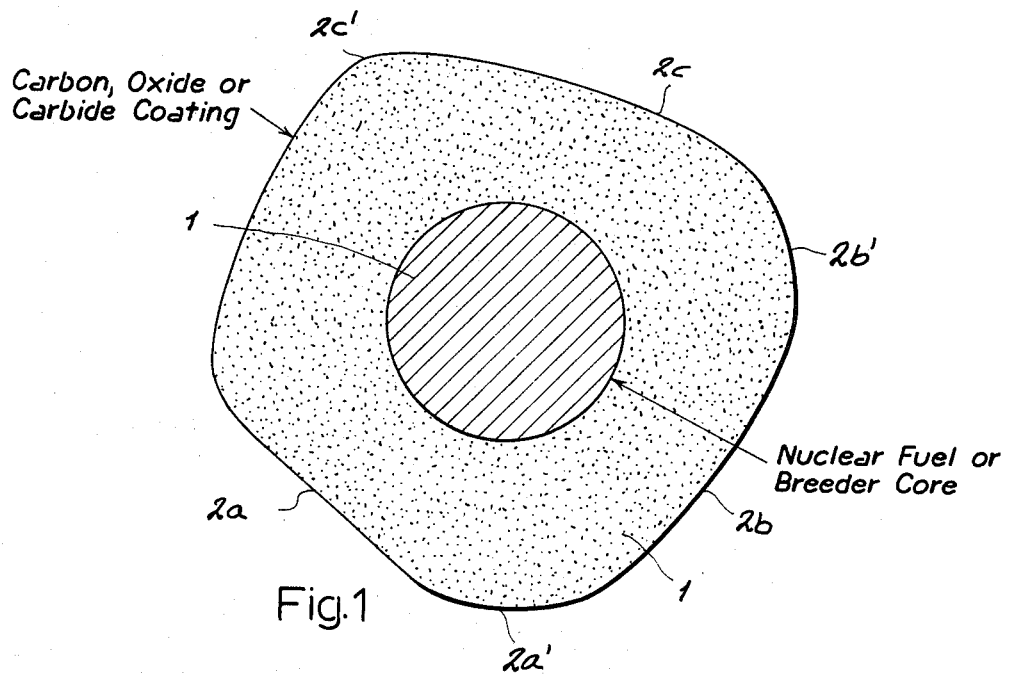
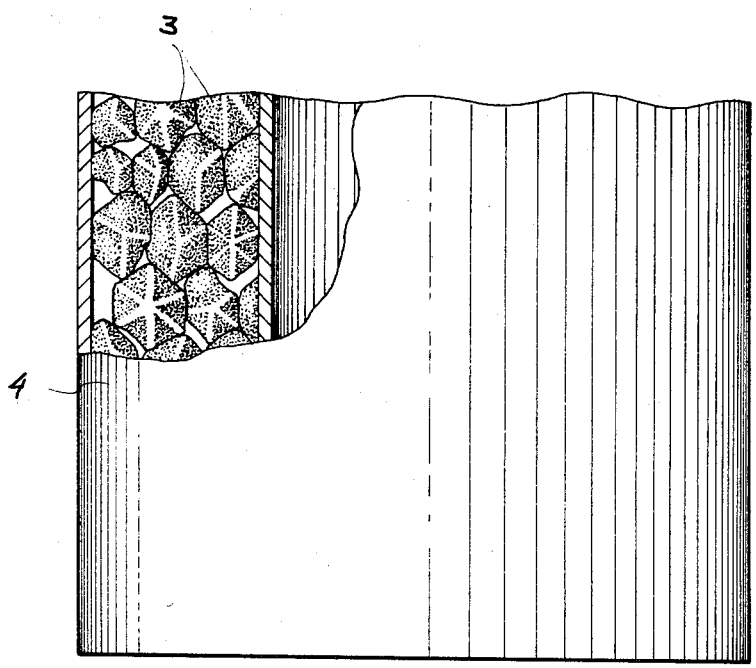

3,413,195
FUEL OR FERTILE ELEMENT FOR
NUCLEAR REACTORS
Alfred Boettcher, Aachen, Germany, assignor to Kernforschungsanlage Julich Gesellschaft mit beschrankter Haftung Nordrhein-Westfalen-e.V., Julich, Germany, a corporation of Germany
Filed June 28, 1966, Ser. No. 561,126
Claims priority, application Germany, June 29, 1965, K 56,501
8 Claims. (Cl. 176—71)

ABSTRACT OF THE DISCLOSURE

Fuel or fertile element for a nuclear reactor core having a hermetically sealed metallic (e.g. Zircaloy) shell. The shell contains a loosely piled mass of coated particles having substantially uniformly spherical core with a diameter of 50–500 microns and a fuel or fertile substance. A coating of pyrolytic graphite, beryllium oxide, aluminum oxide, magnesium oxide, zirconium oxide, zirconium carbide, silicon carbide or niobium carbide, surrounds the core and has a thickness of 50–150 microns. The particles have an irregular outer configuration with a plurality of generally flat surfaces. Helium, at least at atmospheric pressure, constitutes an inert gas filling. The shell which has a generally cylindrical annular compartment receiving the coated particles.

My present invention relates to an improved core element for a nuclear reactor and, more particularly, to a fuel or breeder element adapted to be inserted into the core of a nuclear reactor.

The use of "coated particles" containing a core of a fissionable reactor fuel or a fertile breeder material adapted to be subjected to a neutron flux in order to transmute it into a fissionable material has been proposed heretofore in connection with gas-cooled high-temperature nuclear reactors. In fact, in my copending application Ser. No. 518,298, filed Jan. 3, 1966, and now abandoned and entitled, Nuclear Reactor and Method of Operating Same, I disclose the use of fissionable and/or fertile nuclear materials (e.g. uranium and/or thorium oxides or carbides), which are coated with thin shells of pyrolitically deposited graphite, carbides or oxides for use in gas-cooled reactors. I point out there that the graphite-sheathed fuel or fertile substance can be embedded in a graphite reactor core or in graphite bodies assembled into such a core.

I have also noted in my application Ser. No. 498,786, filed Oct. 20, 1965, and now abandoned and entitled, Fuel Element for Liquid-Cooled Nuclear Reactors, that graphite or carbide-sheathed fuel particles containing a fissionable fuel or a fertile substance encased in a thin shell of pyrolitic carbon or a carbide can be effectively incorporated in a thin-wall metal shell of a corrosion-resistant material such as zirconium alloy (e.g. Zircaloy) or stainless steel, the tubular shell being then hermetically sealed after evacuation to remove air present during the filling operation. The preferred metal of this shell, namely Zircaloy, is a common zirconium alloy (see for example Naval Reactor Physics Handbook, U.S. Atomic Enery Commission 1964, and Metallurgy of Zirconium, McGraw-Hill Book Co., 1955). It was pointed out that a fuel element of this type is particularly effective in liquid-cooled nuclear reactors and has an efficiency far in excess of that of conventional fuel rods using the identical fuel. Moreover, the fuel element operates flawlessly over the lifetime of the fuel. When the metal shell has a thickness of not greater than 0.6 mm., the assembly is characterized by significantly improved conversions with a very high ratio of fission reactions to unit quantity of fuel. While substantially any fissionable material has been found suitable for use for these purposes, it is preferred to employ carbides, oxides and nitrides of the most common fissionable materials (e.g. uranium and thorium).

In the last-mentioned commonly assigned copending application, moreover, it is emphasized that the homogeneity of the reaction sustained by the fuel element is improved and the fission yield augmented when the mass of particles within the shell is an admixture of the encapsulated fuel particles with pulverulent granular or pelletized filler particles of good thermal conductivity. This filler can most advantageously be carbon, beryllium oxide or the like. A further aspect of the fuel element is the configuration of the tubular shell; the tubular shell is preferably of generally cylindrical configuration and can be coaxial with an inner tube for as to define with the latter a hollow cylindrical chamber in which the mass of fuel and filler particles is received. The particles are "loosely packed" or merely "piled" while filling the tube. The term "loosely packed" is thus used to denote a density of the particles within the fuel element of the order of that obtained by a simple piling of the particles in the absence of any packing pressure whatsoever. In the co-axial-tube arrangement, the cooling medium of the reactor contacts both the inner surface of the central tube and the outer surface of the shell.

A further feature of this earlier application and the invention described therein resides in the distribution of the mass of particles. Thus the mass of particles within the annular compartment can be an inhomogeneous distribution whereby the inner and outer walls of the fuel element are maintained at different temperatures. The cooling liquid can thus be raised in temperature in two stages by being passed first into contact with the cooler surface and subsequently into contact with the warmer fuel-rod surface. Of course, the greater the density of the fuel particles adjacent to surface, the higher will be its temperature. This arrangement permits the fuel element to be used effectively in water-moderated super-heated reactors. The inhomogeneous distribution of fuel throughout the fuel rod can be carried out with the aid of conventional mixing and filling devices and without more complex equipment. Moreover, the formation of a nonhomogeneous distribution across the cross-section of the compartment can be attained by the temporary insertion of thin partitions between successively introduced layers or by sliding the particles into place with the aid of guides and the like without permitting mixing of the successively introduced cylindrical layers. Prior to hermetic sealing, the fuel element is advantageously filled with an inert gas, preferably helium, at an elevated pressure (at ambient (room) temperature) selected such that the pressure within the fuel element at the temperature of operation of the reactor will approximate the external pressure applied thereto. The pressure within the fuel rod from the inert gas should range between 5 and 15 atmospheres at 20° C.

It will be understood that while the foregoing developments represent substantial improvements over the state of the art, still earlier methods and techniques involving the use of coated particles gave rise to significant difficulties based upon the very nature of these particles. Thus the pyrolitic-graphite or carbide sheath, while primarily designed to prevent the escape of gaseous fission fragments, was found to markedly decrease the heat-transfer efficiency between the ambient environment and the fuel core. In fact, the effectiveness in blocking the escape of such gaseous fission fragments is a function of the thickness of the graphite or carbide sheath and heat exchange falls significantly with increasing thickness.

It may be pointed out, in connection with the foregoing, that the use of "coated particles" in gas-cooled high-temperature reactors of the character described required a special care with respect to the graphitic or carbide material encapsulating the fissionable or breeding core. For example, exact control of the thickness of the coating and a uniform coating is required to ensure that irradiation or neutron-flux uniformity will be maintained. Furthermore, irregularities in the thickness of the coating made it difficult to determine the proportion of fuel in the mass, especially when only the minimum thickness was critical for retention of gaseous fission fragments. It will be understood that the minimum thickness is selected in accordance with the requirement that diffusion through the coating of fission fragments be completely blocked. Additionally, efforts to keep the coating thickness close to the lower limit have proved to be difficult and to involve a considerable risk of diffusion of fission gases from the particles.

It is, therefore, the general object of the present invention to provide an improved fuel element for a nuclear reactor.

A further object of this invention is to provide a fuel element for nuclear reactors which have a high heat-transfer efficiency and uniformity.

Yet another object of this invention is to provide a fuel element for a nuclear reactor which extends the principles originally set forth in my application Ser. No. 498,786, filed Oct. 20, 1965, and discussed above.

These objects and others which will become apparent hereinafter, are attained, in accordance with the present invention, through the provision of a fuel element for a nuclear reactor which comprises a metal shell enclosing a mass of coated particles of a fertile or fuel substance with at least the pyrolytic carbon, carbide or oxide shell of these particles being of polyhedral configuration. The term "polyhedral" as used herein, is intended to identify an irregular or regular three-dimensional configuration having a multiplicity of angularly adjoining sides or lands even though the junctions between these lands may be somewhat rounded. The configuration of the particles, which may have generally spherical cores of the fertile or fissionable substance, may also be considered as generallyly ball-shaped with flattened portions distributed over its periphery or as a multisided "flattened sphere." It has been observed that it is surprisingly possible to increase the heat-transfer coefficient of the body or coated particle produced in this manner by more than 100 percent when the configuration of the body is altered from a perfect sphere into a polyhedral or multisided one. As described in my copending application Ser. No. 498,786, the coated particles are loosely piled in a cam or metal shell (e.g. of zirconium alloy) and preferably in a metal shell provided with an annular compartment for receiving the particles. The heat-exchange efficiency and flux efficiency of the fuel element is also increased by filling the interstices of the loose piled particles and of the fuel element with an inert gas (especially helium gas) at atmospheric or superatmospheric pressure. It has been found that this arrangement represents a marked advantage over earlier systems using coated particles in that the heat-transfer efficiency is qualitatively improved far beyond any increase in surface area which may arise from the irregularity of the periphery of the coating layer. The surfaces of the fuel element themselves are therefore subjected to a substantially higher heat exchange because of the substantially higher specific surface density of transfer. The pyrolytic graphite coatings can generally be made thinner than has been possible heretofore, while irregularities in the coating are rendered ineffectual. The advantages arise, at least in part, from the fact that any gaseous products of the fission reaction, which diffuse through the coating, are trapped in the metal shell. The core of thorium or uranium oxide or carbide can have a diameter of 50 to 500 microns whereas the coating may have a thickness ranging from 30 to 150 microns.

The above and other objects, features and advantages of the present invention will become more readily apparent from the following description, reference being made to the accompanying drawing in which:

FIG. 1 is an enlarged diagrammatic cross-sectional view through a coated fuel particle in accordance with the present invention; and FIG. 2 is a vertical elevational view of a fuel element embodying the principles of this invention, partly broken away to reveal the coated particles therewithin.

As can be seen from FIG. 1, a coated fuel or fertile particle in accordance with the principles of the present invention comprises a central and generally spherical core 1 of a fuel substance or a fertile substance suitable for use in a breeder-type nuclear reactor. Typical fuels for the purposes indicated include uranium and thorium carbides, oxides and other salts of uranium and thorium. The spherical core 1 is surrounded by an irregular shell 2 of pyrolytic graphite, carbide or oxide commonly used in such coated particles, cf. Ceramic Coated Particle Nuclear Fuels, by R. W. Dayton et al., Journal of Nuclear Materials, vol. 11, No. 1, pages 1–31 (1964). The aforementioned copending applications and publications disclose a host of materials suitable for this purpose and it will be understood that such common coating materials (e.g. pyrolytic carbon, beryllia, alumina, magnesia, zirconia, silicon carbide, zirconium carbide, and niobium carbide can be used herein as well. The essence of the present invention is that the outer configuration of the pyrolytic-carbon or carbide sheet 2 is multisided, i.e. provided with generally flat, concave or even convex surfaces 2a, 2b and 2c, etc. including angles with one another and possibly connected by rounded junctions 2a', 2b', 2c', etc. In any event, the important aspect is the provision of a plurality of sides which are capable of contacting sides of other particles in surface-to-surface engagement. As shown in FIG. 2, the coated particles 3 of irregular polyhedron configuration in the manner described are loosely piled in a fuel can or shell 4 of the annular compartment type so that a cooling fluid can be circulated in contact with the can through the interior as well as along its exterior. The can, prior to hermetic sealing, is filled with helium at the pressures used in application Ser. No. 498,786 or an atmospheric pressure. Prior to filling the can with helium, it is evacuated to remove all traces or air.

EXAMPLE

A mass of coated articles are prepared in the manner described in application Ser. No. 498,786 with generally spherical cores having a diameter of 315 to 340 microns and composed of uranium carbide ($UC_2$). The cores are coated with polyhedral pyrolytic-carbon layers having a thickness of 115±3 microns. The particles are inserted into a circular can of the type illustrated in FIG. 2 and in the manner described in application Ser. No. 498,786 after evacuation, charging of the can with helium, and hermetic sealing of the fuel element. Test showed that, when the fuel element was made with generally spherical particles, they had a characteristic thermoconductivity coefficient or 0.0016±0.003 cal./cm.° C. sec. By contrast, the polygonal bodies had a heat-transfer coefficient of 0.0038±0.0003 cal./cm.° C. sec. When incorporated into a nuclear reactor in the manner set forth in application Ser. No. 498,786, a substantially improved cooling effectiveness was revealed.

The invention as described and illustrated is believed to admit of many modifications within the ability of those skilled in the art and intended to be included within the spirit and scope of the appended claims.

I claim:

1. A fuel element for a nuclear reactor, comprising a hermetically sealed metallic shell, and a loosely piled mass of coated particles received in said shell by a piling of the particles in the absence of packing pressure, said particles each being of irregular outer configuration and having a core consisting of a fissionable fuel and a coating of pyrolytic graphite, beryllium oxide, aluminum oxide, magnesium oxide, zirconium oxide, zirconium carbide, silicon carbide or niobium carbide surrounding said core, each of said coated particles having a plurality of generally flattened surfaces.

2. An element as defined in claim 1 wherein the core of each particle is substantially uniformly spherical with a diameter of 50 to 500 microns and the coating of each particle is irregular and provided with generally flattened faces while having a thickness of substantially 50 to 150 microns.

3. An element as defined in claim 1, further comprising an inert gas filling the interstices of the mass of particles in said shell and hermetically sealed therein.

4. An element as defined in claim 1 wherein said shell is formed with a generally cylindrical annular compartment receiving said coated particles.

5. An element as defined in claim 1 wherein at least some of said sides are angularly adjoining with rounded junctions therebetween.

6. An element as defined in claim 1 wherein said inert gas is helium at least at atmospheric pressure.

7. A fertile element for a nuclear reactor, comprising a hermetically sealed metallic shell, and a loosely piled mass of coated particles received in said shell by a piling of the particles in the absence of packing pressure, said particles each being of irregular outer configuration and having a core consisting of a fertile breeder substance and a coating of pyrolytic graphite, beryllium oxide, aluminum oxide, magnesium oxide, zirconium oxide, zirconium carbide, silicon carbide or niobium carbide, surrounding said core, each of said coated particles having a plurality of generally flattened surfaces.

8. An element as defined in claim 7 wherein the core of each particle is substantially uniformly spherical with a diameter of 50 to 500 microns and the coating of each particle is irregular and provided with generally flattened faces while having a thickness of substantially 50 to 150 microns.

References Cited

UNITED STATES PATENTS

| | | | |
|---|---|---|---|
| 2,820,751 | 1/1958 | Saller | 176—67 X |
| 3,122,595 | 2/1964 | Oxley | 176—91 X |
| 3,262,859 | 7/1966 | Winsche | 176—73 |
| 3,318,779 | 5/1967 | Turner et al. | 176—73 X |

FOREIGN PATENTS

| | | |
|---|---|---|
| 1,270,380 | 7/1961 | France. |
| 891,179 | 3/1962 | Great Britain. |
| 933,500 | 8/1963 | Great Britain. |

CARL D. QUARFORTH, *Primary Examiner.*

M. J. SCOLNICK, *Assistant Examiner.*